Dec. 18, 1956     H. N. OLSON     2,774,273
ANCHOR BOLT HAVING WEDGE SHAPED EXPANDER
MEMBER SECURED THERETO
Filed Sept. 30, 1953
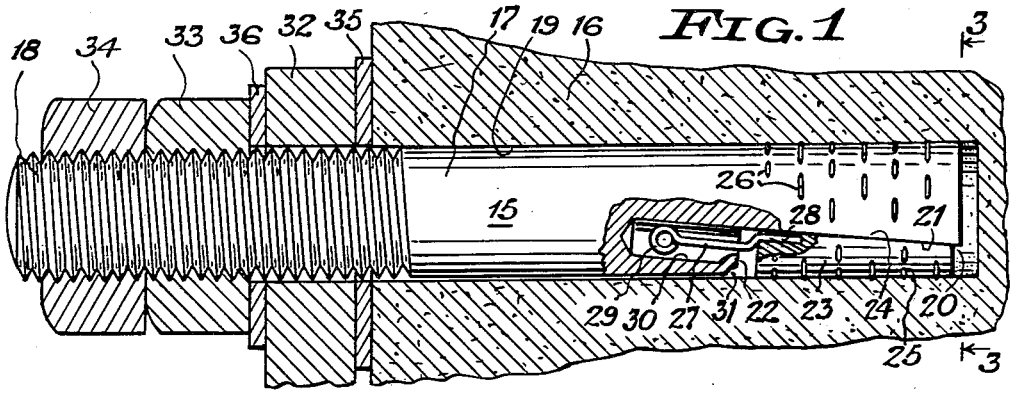
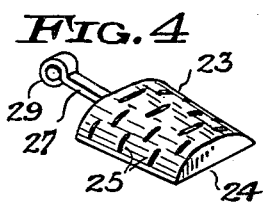
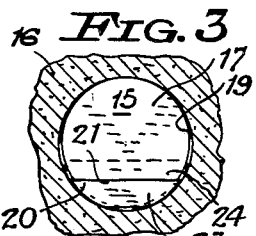
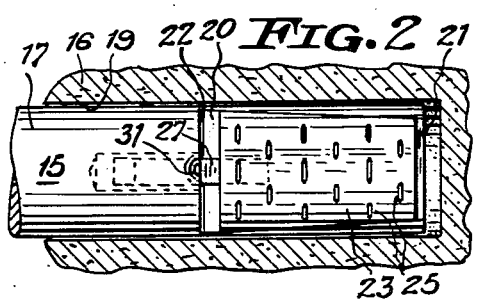
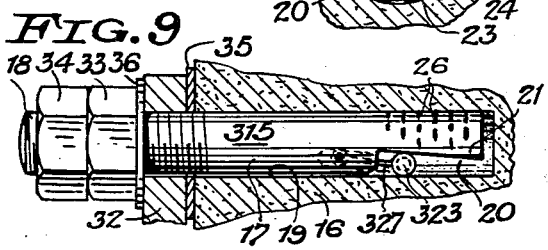
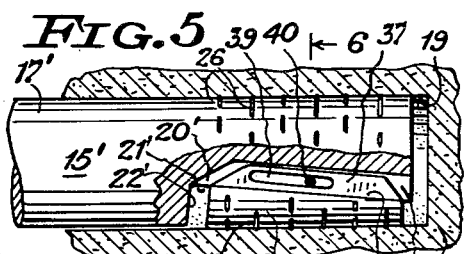
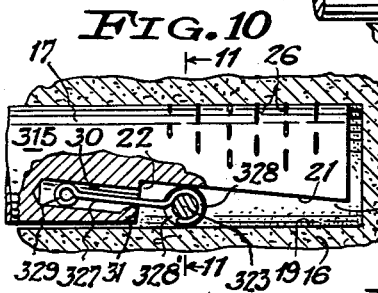
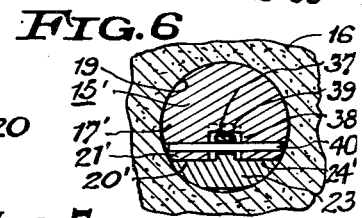
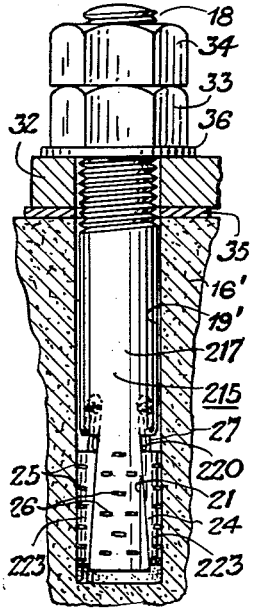
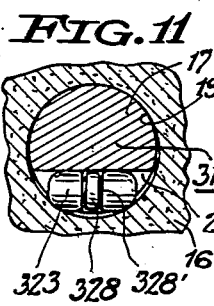
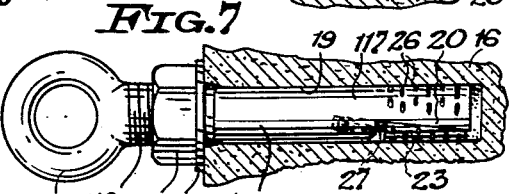
INVENTOR
HENRY N. OLSON
BY Christopher L. Waal
ATTORNEY

United States Patent Office 2,774,273
Patented Dec. 18, 1956

2,774,273

ANCHOR BOLT HAVING WEDGE SHAPED EXPANDER MEMBER SECURED THERETO

Henry N. Olson, Milwaukee, Wis.

Application September 30, 1953, Serial No. 383,259

3 Claims. (Cl. 85—2.4)

The present invention relates to fastening devices and more particularly to anchor bolts, and has for an object to provide an improved anchor bolt of simple and durable construction which can be firmly secured in masonry and other hard materials.

Another object is to provide an anchor bolt which can be secured in a plain cylindrical opening of a diameter only slightly larger than that of the bolt, and which can be mounted in various positions.

A further object is to provide an anchor bolt having a cooperating wedge member movably attached thereto, thus avoiding loss of parts during shipment and storage, and facilitating installation of the bolt.

The invention further consists in the several features hereinafter described and claimed.

In the accompanying drawing, illustrating certain embodiments of the invention,

Fig. 1 is a side view of the bolt as it appears when secured in horizontal position in a masonry wall, parts being broken away and parts being shown in section;

Fig. 2 is a view of the inner end portion of the mounted bolt at the wedge side thereof, the masonry being shown in section;

Fig. 3 is a view of the inner end of the bolt, the masonry being shown in section along the line 3—3 of Fig. 1;

Fig. 4 is a perspective view of a wedge member for the bolt;

Fig. 5 is a side view generally similar to Fig. 1, showing the inner end portion of a modified form of bolt;

Fig. 6 is a transverse sectional view taken generally on the line 6—6 of Fig. 5;

Fig. 7 is a view generally similar to Fig. 1, showing another modified form of bolt;

Fig. 8 is a view generally similar to Fig. 1, showing a further modified form of bolt in upright position serving as a foundation bolt;

Fig. 9 is a view generally similar to Fig. 1, showing a still further modified form of bolt;

Fig. 10 is a view generally similar to Fig. 9, showing the inner end portion of the bolt of Fig. 9, parts being shown in section, and Fig. 11 is a transverse sectional view taken generally on the line 11—11 of Fig. 10.

Referring to the form of the invention shown in Figs. 1 to 4, 15 designates generally an anchor bolt, and 16 designates an apertured member or support, such as a wall of stone or other masonry in which the bolt is to be secured. The bolt comprises a cylindrical stud bolt body 17 having a threaded outer end 18. A plain cylindrical blind hole 19 is formed in the support to receive the bolt body, the hole having a diameter slightly larger than that of the bolt body. The inner end portion of the bolt body has a lateral recess 20 presenting a tapered flat face 21 and a shoulder 22, the depth of the recess decreasing from the shoulder to the end of the bolt body.

A tapered wedge member or key 23 of generally arcuate or segmental cross-section has a flat tapered face 24 slidably bearing on the recess face 21. The outer side of the wedge member is roughened, as by small circumferentially extending ridges 25 formed thereon, and the inner end portion of the bolt body is also roughened, as by similar ridges 26 formed on its cylindrical surface. The outer side of the wedge member 23 is preferably flattened along its middle portion, thus leaving contact areas along opposite sides.

The wedge member 23 is loosely held on the bolt body, as by a retainer comprising a shank or rod 27 of resilient flat wire extending from the thick end of the wedge, one end 28 of the shank being rigidly secured to the wedge as by welding or pinching it thereon, and the other end being curled to form a head 29. The headed end of the shank is housed in a bore or aperture 30 extending into the bolt body from the shoulder 22, the bore axis being substantially parallel to the tapered face 21 of the recess 20. At the outer edge of the shoulder 22 the metal of the bolt body is upset or pressed inwardly at 31 to partially close the entrance of the bore 30 and thus prevent removal of the wedge member shank. However, the wedge member is free to slide longitudinally of the bolt body and also has some freedom of lateral movement so as to insure firm engagement of the wedge member with the walls of the opening 19.

The threaded outer end portion of the bolt body passes through an apertured member 32, such as a machine frame, which is to be held by the bolt, and is provided with a hold-down nut 33 by which the member 32 is clamped to the support 16. If desired, the bolt body may also carry a lock nut 34, and washers 35 and 36 may be provided at opposite faces of the member 32.

When the bolt is to be used, the wedge-carrying end portion thereof is inserted into the support opening 19. In the case of an opening extending in a generally horizontal direction the wedge member is preferably at the underside of the bolt, as shown. At this time the washer 35 and apertured member 32 are usually in place, although in some instances the latter parts may be installed later. The washer 36 and the nut 33 are then placed on the bolt and the nut 33 is tightened, thus urging the bolt outwardly a short distance and causing the wedge member to be forced against the side wall of the opening into gripping engagement therewith, so as to anchor the bolt firmly in the opening and to clamp the member 32 in place. The lock nut 34 is then screwed onto the bolt body. The roughened upper side of the bolt body engages the upper wall of the opening, and the roughened lower side portions of the flattened wedge member 23 engage the lower wall of the opening, thus providing in effect a three-point bearing.

While the anchor bolt is here shown to be secured in a masonry member, it may also be used in members of other hard materials such as metal and wood.

The modified form of anchor bolt 15' shown in Figs. 5 and 6 is similar to that of Fig. 1 except for the wedge-retaining means. The bolt comprises a bolt body 17' the inner end portion of which is provided with a lateral recess 20' presenting a flat tapered surface 21' and shoulder 22'. A wedge member or key 23' slidably bears on the tapered surface 21' and has along its flat surface 24' a longitudinally extending rib or flange 37 projecting loosely into a longitudinally extending groove or channel 38 formed in the tapered surface 21' of the bolt body. A longitudinal slot 39 is formed in the rib 37 and receives loosely therethrough a retaining pin 40 which is driven transversely through the bolt body. The wedge member 23' is free to slide along the tapered surface 21 and also has some freedom of lateral movement. The bolt of Figs. 5 and 6 is otherwise the same as that of Fig. 1 and is applied and used in the same manner.

The modified form of bolt 115 shown in Fig. 7 is generally similar to that of Fig. 1 except that the outer portion of the bolt body 117 thereof has formed integrally therewith a transversely apertured head or eye 132 and a threaded portion 118 which latter carries a nut 33 and washer 35, the threaded portion 118 being preferably slightly larger in diameter than the shank portion of the bolt body. This form of bolt may also be used for lifting or suspending articles such as stone blocks. In assembling the bolt, the nut and washer are passed over the bolt body from the reduced inner end thereof.

The modified form of bolt 215 shown in Fig. 8 is generally similar to that of Fig. 1 except that it is applied to a vertical hole 19' in a masonry floor 16', and the inner end of the bolt body 217 thereof has diametrically opposite recesses 220 cooperating with respective wedge members 223. Each recess 220 has a tapered face 21 cooperating with a tapered face 24 of the adjacent wedge member. The wedge members are retained on the bolt body in the same manner as the wedge member of Fig. 1.

The modified form of bolt 315 shown in Figs. 9 to 11 includes a bolt body 17 which is identical with that of Fig. 1 but cooperates with a wedge member 323 in the form of a roller engaging the flat tapered surface 21 of the bolt body recess 20. The roller is retained in assembled relation on the bolt body by a retainer comprising a shank or rod 327 of resilient flat wire. The wire shank has a hooked end 328 snapped loosely into an annular groove 328' formed in the roller at its middle portion. The other end of the shank is looped or curled to form a head 329 fitting loosely in a bore 30 in the bolt body. At the shoulder 22 of the bolt body recess 20 the metal is upset or pressed inwardly at 31 to partially close the outer end of the bore, thus preventing separation of the shank-carrying roller from the bolt body.

The bolt 315 is used and applied in the same manner as the bolt 15, the roller 323 being wedged against the wall of the opening 19 and biting therein, thus firmly securing the bolt in the opening.

Each of the several forms of anchor bolts may extend in an opening facing in any direction, including a downwardly facing opening formed in a ceiling. In the latter case the wedge member will rest against the shoulder 22 of the bolt during upward insertion of the bolt into the opening, and is then frictionally held against the side wall of the opening by lateral pressure on the bolt as the bolt is initially urged downwardly, whereupon further downward tension on the bolt will effect locking of the bolt in the opening.

I claim:

1. In an anchor bolt, a bolt body member adapted for axial insertion into an opening in a support and having a lateral recess presenting a face tapered longitudinally of said member and further presenting a shoulder at the deeper end of said recess, said body member having formed longitudinally therein an aperture opening at said shoulder and provided with a restriction adjacent said shoulder, a wedge member cooperating with said tapered face and adapted for engagement with the walls of said opening for firmly securing the bolt in the opening, and a retaining member slidable longitudinally in said aperture and attached to said wedge member, said retaining member extending longitudinally of said bolt body member and substantially parallel to said tapered face and the path of said wedge member and having a head portion in said aperture loosely confined therein against withdrawal by said restriction.

2. In an anchor bolt, a bolt body member adapted for axial insertion into an opening in a support and having a lateral recess presenting a face tapered longitudinally of said member and further presenting a shoulder at the deeper end of said recess, said body member having formed longitudinally therein an aperture opening at said shoulder, a wedge member cooperating with said tapered face and adapted for engagement with the walls of said opening for firmly securing the bolt in the opening, and a retaining member having a headed end portion loosely confined in said aperture and further having its other end portion attached to said wedge member, said retaining member extending longitudinally of said bolt body member and slidable longitudinally in said aperture, said bolt body member having an upset portion partially closing the entrance of said aperture to prevent withdrawal of the headed end portion of said retaining member.

3. In an anchor bolt, a bolt body member adapted for axial insertion into an opening in a support and having a lateral recess presenting a face tapered longitudinally of said member, a roller wedge member having its axis of rotation extending transversely of the bolt body and having a rollable engagement with said tapered face and cooperating therewith for firmly securing the bolt in said opening, said bolt body member having an aperture extending longitudinally therein, and retaining means movably connecting said bolt body member and roller wedge member comprising a retaining element slidable longitudinally in said aperture, said retaining element having a head portion at one end loosely confined in said aperture against withdrawal, and the other end of said retaining element being loosely attached to said roller wedge member.

References Cited in the file of this patent

UNITED STATES PATENTS

| | | |
|---|---|---|
| 450,127 | Wrigley | Apr. 7, 1891 |
| 922,980 | Vernon | May 25, 1909 |
| 1,110,797 | Knox | Sept. 15, 1914 |
| 1,193,436 | Shoup | Aug. 1, 1916 |
| 1,311,038 | Bowman | July 22, 1919 |
| 1,396,398 | Bowman | Nov. 8, 1921 |
| 2,143,086 | Pleister | Jan. 10, 1939 |
| 2,547,789 | Skell | Apr. 3, 1951 |